United States Patent
Rice et al.

[11] Patent Number: 5,898,288
[45] Date of Patent: Apr. 27, 1999

[54] INEXPENSIVE MOTION CONTROL USING DC MOTORS

[75] Inventors: Huston W. Rice; Robert P. Callaway; George Barbehenn; Jason Quintana, all of Vancouver, Wash.

[73] Assignee: Hewlett-Packard Company, Palo Alto, Calif.

[21] Appl. No.: 08/789,903

[22] Filed: Jan. 29, 1997

[51] Int. Cl.⁶ ..................................................... H02P 8/00
[52] U.S. Cl. ........................... 318/685; 318/696; 318/254
[58] Field of Search ..................... 318/138, 245, 318/254, 696, 685, 599, 439; 388/903; 347/162, 211, 218, 180; 400/17, 18, 19, 322, 903; 346/140 A, 29, 139 R

[56] References Cited

U.S. PATENT DOCUMENTS

| | | | |
|---|---|---|---|
| 3,855,511 | 12/1974 | Smith | 318/317 |
| 4,359,674 | 11/1982 | Gotou | 318/318 |
| 4,684,858 | 8/1987 | Ma et al. | 318/317 |
| 4,829,218 | 5/1989 | Bauer | 388/811 |
| 4,893,067 | 1/1990 | Bhagwat et al. | 388/817 |
| 4,906,910 | 3/1990 | Tanuma et al. | 318/696 |
| 4,989,116 | 1/1991 | Gruner et al. | 361/154 |
| 5,225,751 | 7/1993 | Kusano et al. | 318/434 |
| 5,625,269 | 4/1997 | Ikeda | 318/696 |
| 5,708,578 | 1/1998 | Stoddard et al. | 363/98 |

*Primary Examiner*—Paul Ip

[57] ABSTRACT

Disclosed herein is a motion monitoring system for monitoring movement of a brush-type DC motor. The system includes an electrical comparator having first and second differential inputs. A current detector is connected to provide a drive current signal to the first differential input of the comparator. A low-pass filter is connected to provide an averaged drive current signal to the second differential input of the comparator. When a drive current is applied to the motor, the comparator produces a stream of binary logic-level pulses corresponding to motor movement. The pulses can be used to determine motor position and velocity.

20 Claims, 4 Drawing Sheets

5,898,288

INEXPENSIVE MOTION CONTROL USING DC MOTORS

TECHNICAL FIELD

This invention relates to controlling the position and velocity of DC brush-type motors such as used in inkjet printers for positioning of service station mechanisms.

BACKGROUND OF THE INVENTION

This invention relates to ink-jet printing mechanisms, and more particularly, to drive motors used in ink-jet printers, plotters, scanners, facsimile machines, and the like.

An inkjet printing mechanism is a type of non-impact printing device which forms characters and other images by controllably spraying drops of ink from a printhead. Inkjet printing mechanisms may be employed in a variety of devices, such as printers, plotters, scanners, facsimile machines, and the like. For convenience, inkjet printers are used herein to illustrate the concepts of the present invention.

The printhead ejects ink through multiple nozzles in the form of drops which travel across a small air gap and land on a recording media. The drops are very small. Inkjet printers commonly print within a range of 180 to 600 dots per inch (dpi). The ink drops dry on the recording media shortly after deposition to form the desired printed images.

There are various types of inkjet printheads including, for example, thermal inkjet printheads and piezoelectric inkjet printheads. By way of example, for a thermal inkjet printhead, ink droplets are ejected from individual nozzles by localized heating. A small heating element is disposed at individual nozzles. An electrical current is passed through the element to heat it. This causes a tiny volume of ink to be rapidly heated and vaporized by the heating element. The vaporization causes the ink to be ejected through the nozzle. A driver circuit is coupled to individual heating elements to provide the energy pulses and thereby controllably deposit ink drops from associated individual nozzles. Such drivers are responsive to character generators and other control logic to energize selected nozzles of the printhead for forming desired images on the recording media.

During printing, ink tends to build up at the nozzle orifices on the printhead. This build-up can be caused by ink droplets that are not completely ejected, excess ink at the orifice that is not vaporized during ejection, or ink splatterings that reflect from the recording media. The resident ink on the printhead can clog the nozzle orifices and detrimentally disrupt or impair proper printing.

Conventional inkjet printers are often equipped with service station mechanisms that include wiper assemblies designed to periodically clean the nozzle section of the inkjet printhead to remove any resident ink. Typically, the wiper assembly has an individual wiper for each printhead which engages and scrubs the printhead orifices. The wiper assembly is alternately moved to an activated position suitable for cleaning the printhead and then to a retracted position where it does not interfere with the printhead during printing.

A service station can be configured to perform different printhead maintenance tasks. Capping nozzles when they are not in use is another example of a service station function.

A service station must typically be moved between two or more positions. In many configurations, there is a need to control the position and/or velocity of the motor and associated mechanism. This is often accomplished with motor positional feedback provided by an integrated or external encoder. In some environments, such as in magnetic-based hard-disk drives, feedback is provided without an encoder, by using back-EMF sensing. However, this technique is not commonly used in conjunction with brush-type DC motors. Furthermore, back-EMF sensing is used primarily for velocity control rather than position control.

Step motors can be used in some situations to eliminate the cost and complexity associated with external feedback devices. However, step motors are noisy and subject to positional errors.

The inventors have found a way to monitor and control the velocity and position of a conventional, brush-type, DC motor, without requiring an external encoder. When used to position a service station in an inkjet printer, cost is reduced by eliminating the need for stepper motors or encoders.

SUMMARY OF THE INVENTION

The invention utilizes a differential comparator to produce a binary stream of pulses that correspond to motor movement. Specifically, the comparator is connected to detect ripples in the drive current supplied to the motor, and to convert such ripples to a logic-level signal.

DETAILED DESCRIPTION OF THE PREFERRED EMBODIMENT

The present invention can be used in many different devices. It is particularly suited for use in printing devices such as inkjet printers, and for providing motion control for the service station mechanism in such printers.

Figure 1:
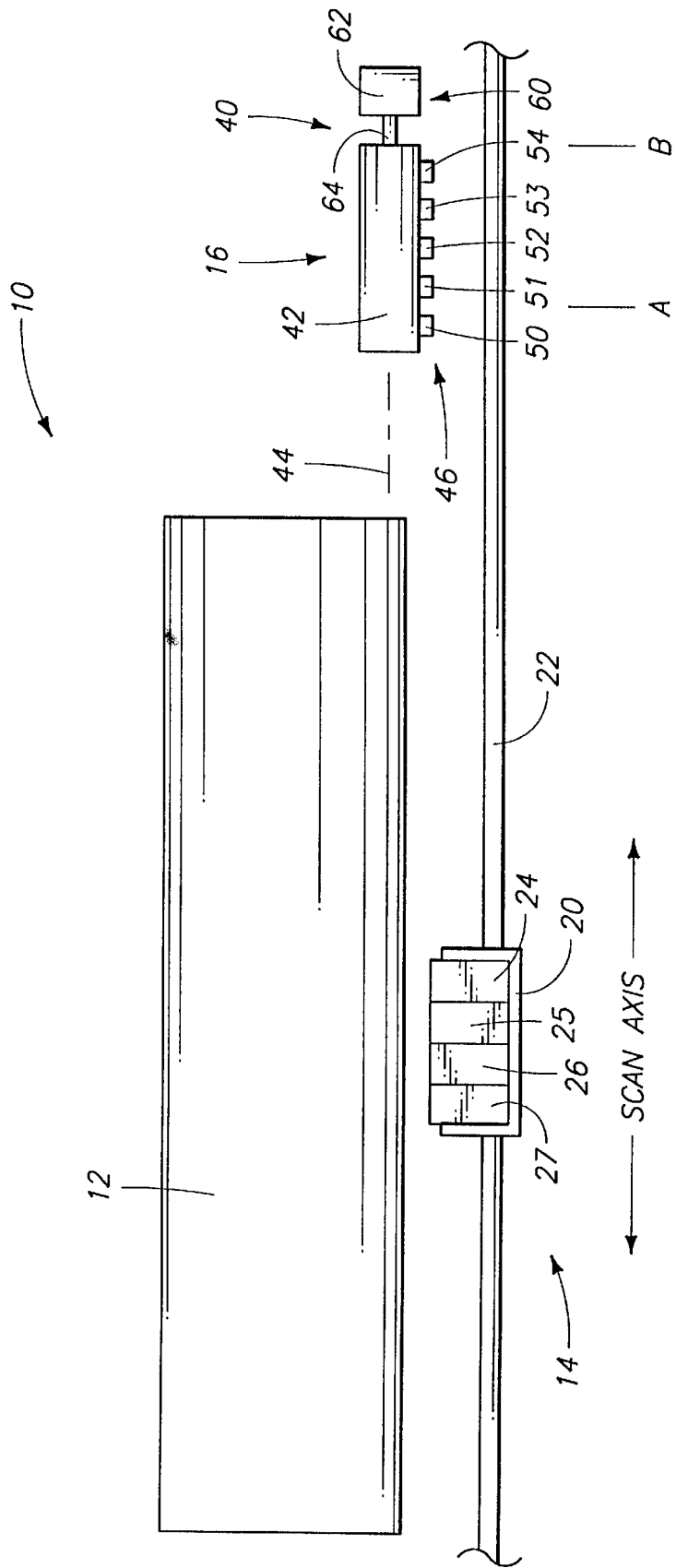
FIG. 1 is a diagrammatic view of an inkjet printer in accordance with the invention.

As an example, FIG. 1 shows one embodiment of a shuttle-type inkjet printer or printing mechanism 10 (of which only pertinent components are shown) utilizing the invention. Printing mechanism 10 includes a platen 12, a shuttle assembly 14, and a service station 16 positioned to service the printhead. Platen 12 supports a recording media (not shown) during printing. The platen can be stationary, or rotatable to assist in advancing the media through the printing mechanism. A media feed mechanism (not shown), such as conventional friction rollers or a tractor feed system, may be used to drive the media through the printing mechanism along a media feed path.

Shuttle assembly 14 includes a carriage 20 slidably mounted on a fixed, elongated guide rod 22 to move bidirectionally across platen 12. Carriage 20 is designed to maneuver over the full width of the platen, thereby entirely traversing the print zone, as well as moving to service station 16 outside of the print zone. Shuttle assembly 14 includes a drive subassembly (not shown) that is mechanically coupled to drive carriage 20 back and forth along rod 22. A typical drive subassembly includes a wire or belt attached to carriage 20 and wound around opposing pulleys, and a motor (e.g., a stepper motor or DC motor) connected to power one of the pulleys. A rotary encoder is coupled to the motor drive shaft to monitor incremental shaft rotation and provide feedback data for use in positioning and controlling the carriage.

The shuttle assembly 20 described herein is provided for explanation purposes and its construction is well known in the art. Other types of shuttle assembly configurations may alternatively be employed while still embodying the invention.

Carriage 20 supports and carries one or more printheads which are preferably embodied as permanent, disposable print cartridges or pens. In this embodiment, carriage 20 is shown as carrying four printheads 24, 25, 26, and 27. The printheads preferably contain ink of different colors. The carriage moves the printheads back and forth over platen 12.

A variety of different carriage subsystems can be used in conjunction with this invention. One example construction of a carriage subsystem which supports multiple printheads is described in U.S. Pat. No. 5,109,239, assigned to Hewlett-Packard Company.

A wiper assembly 40 is mounted at service station 16 to clean the nozzles of printheads 24–27. The printheads are cleaned periodically during operation. The printing mechanism schedules routine servicing based upon the printing time, the number of ink drops being ejected, and other factors. As an example, the printheads may be cleaned approximately once every minute or once every page of a sheet stock recording media.

When ready for servicing, carriage 20 moves printheads 24–27 to service station 16. In general, wiper assembly 40 has a first wiper portion which cleans a first set of printhead nozzles when the carriage is located at a first servicing position. The wiper assembly also has a second wiper portion which simultaneously cleans a second set of printheads when the carriage is located at a second servicing position.

Wiper assembly 40 includes a central core member 42 extending along a longitudinal axis 44. Wiper assembly 40 further has a wiping mechanism 46 attached to core member 42 and radially extending from longitudinal axis 44. Wiper mechanism 46 has a plurality of wiping regions. The illustrated individual discrete wipers each have an elongated blade which engages and wipes associated printhead nozzle sections to remove ink build-up. While many different wiper constructions may be employed in conjunction with this invention, an example wiper construction is described in U.S. Pat. No. 5,151,715, assigned to Hewlett-Packard Company.

In the illustrated construction, wiper assembly 40 further includes a drive mechanism 60 that moves central core member 42 about longitudinal axis 44 to cause the discrete wipers 50–54 to clean corresponding nozzle sections of the printheads. In the illustrated embodiment, the drive mechanism 60 comprises a small, brush-type, DC motor 62 and a drive shaft 64 which interconnects motor 62 to core member 42.

The forgoing is disclosed merely as one example of an inkjet printer and of a service station such as might be employed in such a printer. A great variety of other printer and other service station configurations might alternatively be used, requiring various types of rotational and translational movement with a relatively low degree of positional accuracy for which the invention is ideally suited. See U.S. Pat. Nos. 5,155,497, 5,455,609, and 4,853,717, hereby incorporated by reference, for examples of other printers and service station configurations in which the invention might be utilized.

Figure 2:
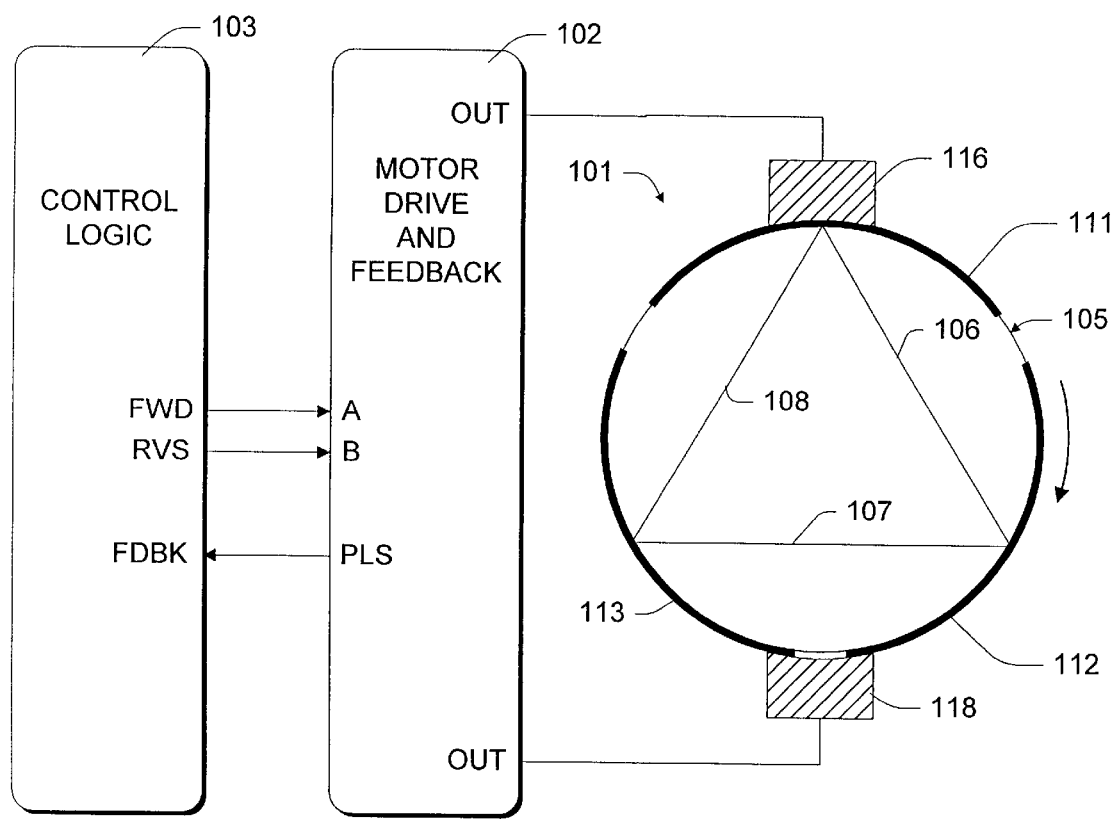
FIG. 2 is a block diagram of a motion monitoring and control system in accordance with the invention.

FIG. 2 shows a motion monitoring and control system used to move a service station such as service station 16 described above and to monitor movement of the service station. The system includes a motor 101, motor drive and feedback circuit 102, and control logic 103. Motor 101 is a conventional DC brush-type motor having a rotor 105 with three windings labeled 106, 107, and 108. The rotor has three contacts, labeled 111, 112, and 113, corresponding to and electrically connected to the poles of the windings. A pair of brushes 116 and 118 are positioned at 180° from each other, at opposite electrical sides of the rotor. The brushes are in sliding electrical with the contacts. Other configurations of DC brush-type motors might alternatively be employed, having different numbers of brushes and windings.

Motor drive and feedback circuit 102 is configured to apply a drive current to motor 101. Circuits 102 also produce pulses in response to rotation of motor 101. Circuits 102 accept low-level binary signals A and B to drive the motor in opposite directions, respectively. When signal A is active, a voltage is applied to motor 101 at a first polarity. When signal B is active, a voltage is applied to motor 101 at a second, opposite polarity. In the described embodiment, only on/off and forward/reverse control of motor 101 is provided. No speed control is provided.

Motor drive and feedback circuit 102 also provides a feedback signal PLS in the form of a pulse stream. Six pulses are produced for every complete revolution of motor 101. In more general terms, each motor revolution generates a number of pulses equal to twice the number of the motor's poles. These pulses can be used to monitor rotational position and velocity of motor 101. When the motor is geared to other components at a known gear ratio, the pulses can be used to monitor the position and velocity of such components.

Control logic 103 comprises a microprocessor or some other type of logic implemented within printer 10. It has low-level outputs FWD and RVS, connected to the A and B inputs of circuit 102, respectively. By activating these outputs, it can apply drive current to motor 101 through motor drive and feedback circuit 102.

Control logic 103 also has an input FDBK connected to output PLS of circuit 102. Through this input, control logic 103 can monitor the position and speed of motor 101.

Control logic 103 is programmed or configured to implement the desired operating characteristics of printer 10 and service station 16. To move the motor and associated service station in a first direction, control logic 103 activates the FWD output. To move the motor and associated service station in a second direction, control logic 103 activates the RVS output.

Position and velocity determination logic are implemented within control logic 103 to determine motor velocity and position in response to pulses at input FDBK that result from motor rotation. When either of outputs A or B is activated, control logic 103 monitors its FDBK input and counts the resulting pulses. Each pulse corresponds to a known rotational amount. Control logic 103 continuously monitors the pulses and deactivates its output when the desired position is attained. A homing routine utilizing a hard stop or a limit switch can be used for calibration of an initial position, since the position feedback is incremental rather than absolute.

Pulses are summed over a time interval to determine motor velocity. While there is no provision in the illustrated embodiment of the invention for varying the speed of motor 101, control logic 103 might make use of velocity information for other purposes. Furthermore, other embodiments such as those described below might allow control logic 103 to vary the drive current supplied to motor 101, thereby varying and controlling its velocity.

Motor drive and feedback circuit 102 utilizes an inherent characteristic of DC motors to generate binary pulses in response to and corresponding to motor rotor movement. This characteristic is illustrated by FIGS. 2–5.

Figures 3, 4:
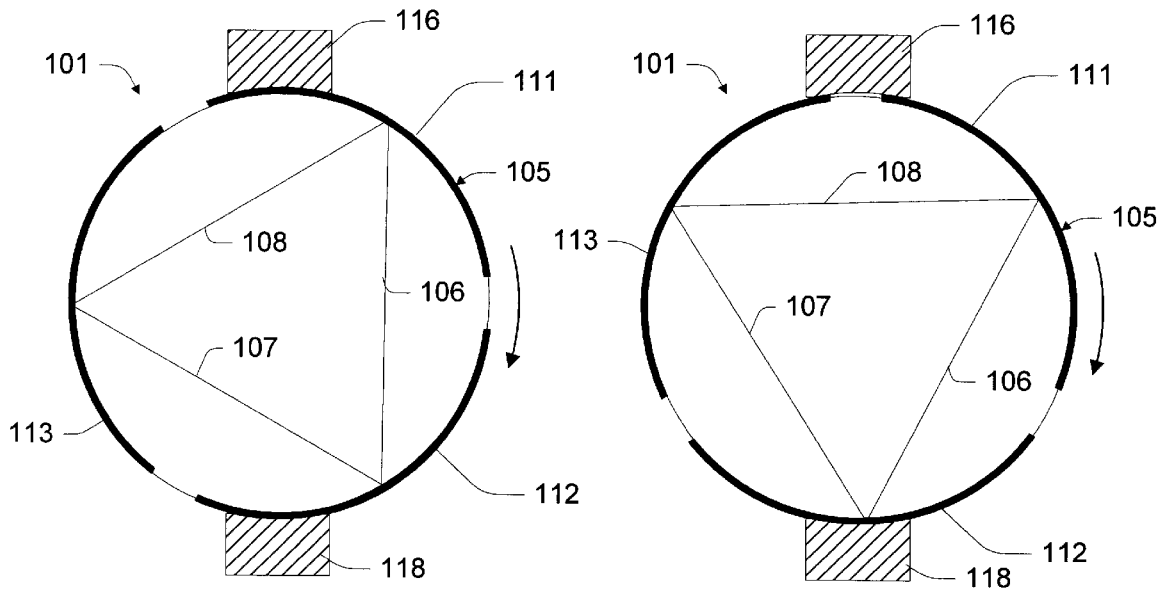
FIGS. 3–5 illustrate rotation of a rotor in a DC brush-type motor such as shown in FIG. 2.

In FIG. 2, rotor 105 is positioned so that brush 116 touches contact 111. Brush 118 is touching both contact 112 and contact 113. Thus, current flows through both winding 106 and winding 108. In FIG. 3, rotor 105 has rotated slightly in the clockwise direction, so that brush 116 still touches contact 111, but brush 118 is now contacting only contact 112. Now, current flows only through winding 106. Because only one winding is being utilized in FIG. 3, there is relatively more impedance than in FIG. 2 where two windings are utilized in parallel. Thus, less current flows in the position of FIG. 3 than in the position of FIG. 2.

Figure 5:
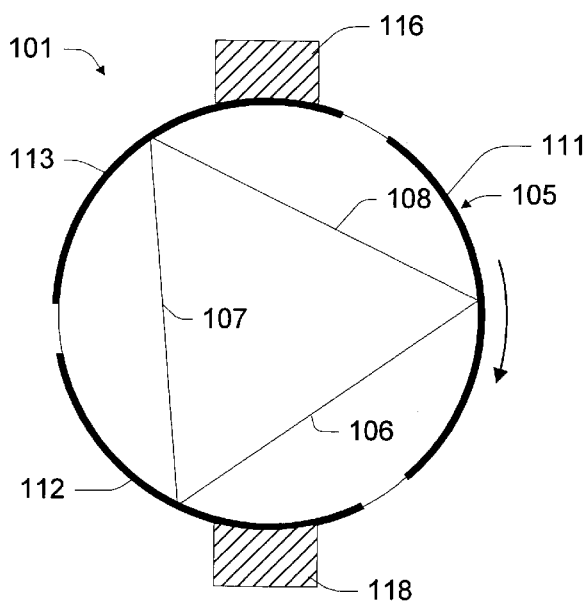

In FIG. 4, however, the rotor has rotated until brush 116 is shorting the two contacts 111 and 1113. A relatively large amount of current now flows again through windings 106 and 107 in parallel. In FIG. 5, the rotor has rotated again to a position in which only a single winding is utilized, and in which the current is comparatively low.

Figure 6:
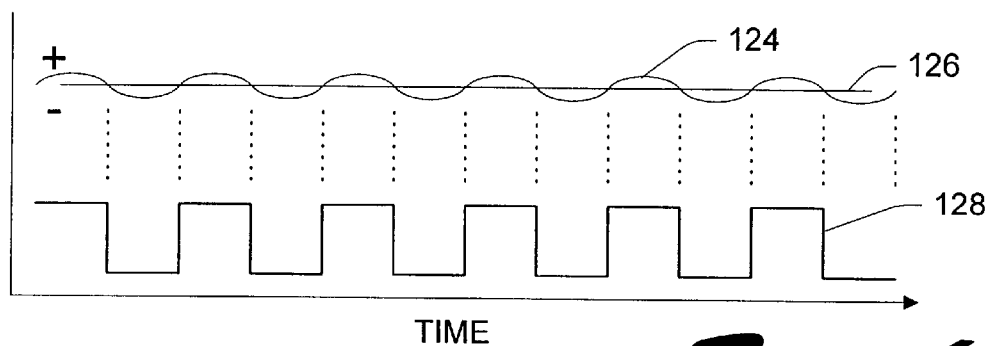
FIG. 6 is shows waveforms that are present in the system of FIG. 2.

FIG. 6 shows a current waveform 124 representing the current through a DC motor such as the one illustrated in FIGS. 2–5. As shown, the waveform varies or ripples around an average current represented by waveform 126. The average current 126 will itself vary with time, depending on the imposed motor load. However, the average current will vary at a much lower frequency than the ripple current represented by waveform 124.

Motor drive and feedback circuit 102 has circuits for producing a stream of binary logic-level pulses at the frequency of the ripple current, which in turn corresponds to the motion or velocity of motor 101. Such a binary pulse stream is shown in FIG. 6, beneath waveforms 124 and 126. The binary pulse stream is labeled with reference numeral 128. This pulse stream corresponds to output PLS of circuit 102. It is at a high logic level whenever ripple current waveform 124 exceeds average current waveform 126. It is at a low logic level whenever ripple current waveform 124 is less than average current waveform 126.

Figure 7:
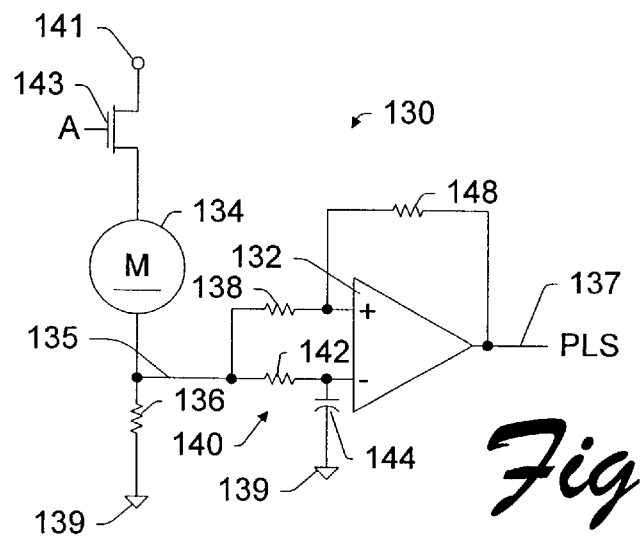
FIG. 7 shows one embodiment of a motion monitoring circuit in accordance with the invention.

FIG. 7 shows a motion monitoring circuit 130 in accordance with one embodiment of the invention. In general, the circuit comprises an electrical comparator 132 that acts as a pulse detector connected to detect pulses in the drive current of a DC motor 134 caused or induced by brush commutation in motor 134. In this example, motor 134 is connected between a common negative voltage source 139 and a positive power source 141, through a switch or switching transistor 143 that is controlled by input A of motor drive and feedback circuit 102. In this example, the motor can be powered in only a single direction—input B is not utilized.

The motion monitoring circuit utilizes a current detector or sensing resistance 136 connected in series with the motor and its drive current to produce a drive current signal 135. The drive current signal is a voltage that varies with the drive current. The drive current signal is connected to an input of the comparator, and the comparator is responsive to this voltage to produce a binary logic-level pulse stream at an output 137. In the embodiment of FIG. 7, the current sensing detector is a passive resistor connected in series with the motor's connection to negative power source 139. The current detector forms means for creating the drive current signal and for providing it to an input of comparator 132.

Even more specifically, comparator 132 has first and second differential inputs, generally referred to as positive (+) and negative (−) inputs. The negative input is also referred to as a reference input. The drive current signal produced by current sensing resistance 136 is connected to the first or positive differential input through a resistor 138.

The circuit includes means for providing an averaged drive current signal to the second or reference input of the comparator. Specifically, a low-pass filter 140 is connected between current sensing resistance 136 and the second or negative differential input of the comparator. Low-pass filter 140 comprises a resistor 142 between current sensing resistance 136 and comparator 132, and a capacitor 144 connected from the negative input of comparator 132 to common. Positive feedback is added by means of a resistor 148 connected between the output 137 of the comparator and the positive input of the comparator. Output 137 corresponds to output PLS of FIG. 2.

Speed control can be provided in this circuit by driving transistor 143 in its linear range to provide a variable drive voltage and current. Alternatively, an operational amplifier capable of high output currents could be used to drive motor 134 at a variable voltage and current.

As another alternative, speed control can be accomplished in the circuit of FIG. 7 by using a pulse-width modulation scheme, wherein the pulse-width modulation is carried out at a frequency that is much greater than the frequency of expected positional pulses generated by motor rotation. Low-pass filter 140 will mask this higher frequency from comparator 132.

Figure 8:
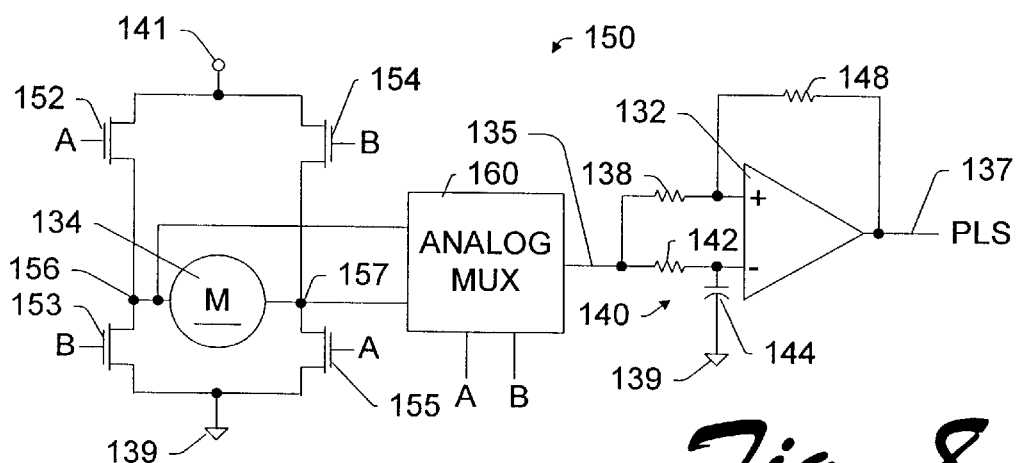
FIG. 8 shows another embodiment of a motion monitoring circuit in accordance with the invention.

FIG. 8 shows a slightly different embodiment of a motion monitoring circuit, generally designated by reference numeral 150. Circuit 150 is identical to circuit 130 in most respects except in how it produces drive current signal 135. Components of FIG. 8 that are identical to those of FIG. 7 are labeled with the same reference numerals.

In the embodiment of FIG. 8, motor 134 is driven with an A-bridge transistor network having transistors 152, 153, 154, and 155 connected to supply drive current in response to signals FWD and REVS from control logic 103. Thus, the gates of the resistors correspond to inputs A and B of motor drive and feedback circuit 102.

A first pair of transistors 152 and 153 are connected in series between positive and negative power sources 141 and 139. Transistor 152, connected to the positive power source, is turned on by input A. Transistor 153, connected to the negative power source, is turned on by input B. The junction 156 between the transistors is connected to a first brush of motor 134. A second pair of transistors 154 and 155 are similarly connected in series between the positive and negative power sources. Transistor 154, connected to the positive power source, is turned on by input B. Transistor 155, connected to the negative power source, is turned on by input A. The junction 157 between the transistors is connected to a second brush of motor 134.

Activating two diagonally opposite transistors will supply current to rotate the motor in a first direction. Activating the other two diagonally opposite transistors will supply current to rotate the motor in a second, opposite direction. Thus, activating A turns the motor in the first direction and activating B rotates the motor in the second direction.

In this case, the current detector comprises the activated one of the H-bridge transistors 153 and 155. When A is activated, the current detector comprises transistor 155, with a drive current signal being generated at junction 157. When B is activated, the current detector comprises transistor 153, with the drive current signal being generated at junction 156. These junctions are connected to an analog multiplexer 160, which is responsive to inputs A and B to connect the proper junction to comparator 132.

As in the example of FIG. 7, the speed control can be provided either by driving the H-bridge transistors in their linear modes or by using a high-frequency pulse-width modulation.

The circuits described with reference to FIGS. 7 and 8 provide inexpensive embodiments of the invention, providing incremental position feedback at their PLS outputs. Such incremental position feedback can be used in accordance with a number of known techniques to monitor and control motor movement. Other circuits might also be designed to convert the drive current signal 124, shown in FIG. 6, to the logic-level pulse stream 128 that is also shown in FIG. 6

Furthermore, while the invention has been described primarily in terms of its electronic and electromechanical features, the invention also includes the methodological steps implemented by the described features. Such steps include driving a DC brush-type motor with an applied driver current and deriving an average drive current based on the applied drive current. Further steps include comparing the applied drive current to the average drive current to detect pulses in the drive current caused by brush commutations.

The invention will be useful in a wide range of applications where it is desired to provide positional and velocity control using inexpensive DC motors. The invention will be particularly useful in printers, where drive motors are frequently used to position components with relatively low positional accuracy. Positioning service station components is a specific example of the use of the invention in a printer.

While the invention has been described in language more or less specific as to structural and methodological features, it should be understood that the invention is not necessarily limited to the specific features described. Rather, the means disclosed above comprise preferred forms of putting the invention into effect. The invention is claimed in any of its forms or modifications within the proper scope of the appended claims, appropriately interpreted in accordance with the doctrine of equivalents.

What is claimed is:

1. A motion monitoring system for monitoring movement of a brush-type DC motor that is driven by a drive current, comprising:
   a pulse detector responsive to a drive current signal and an averaged drive current signal to detect commutator-induced pulses in the drive current, wherein the commutator-induced pulses correspond to motion of the motor;
   motion determination logic configured to determine motor motion in response to the detected commutator-induced pulses in the drive current.
2. A printer having the motion monitoring system recited in claim 1.
3. A motion monitoring system as recited in claim 1, wherein the pulse detector comprises:
   a comparator having at least one input;
   a current sensing resistance connected in series with the drive current to produce a voltage that varies with the commutator-induced ripple of the drive current, said voltage being connected to said at least one input of the comparator.
4. A motion monitoring system as recited in claim 3, further comprising the brush-type DC motor.
5. A motion monitoring system as recited in claim 3, the current sensing resistance comprising a resistor.
6. A motion monitoring system as recited in claim 3, the current sensing resistance comprising a transistor connected in series with the drive current to drive the motor.
7. A motion monitoring system as recited in claim 3, the current sensing resistance comprising a transistor that is part of an H-bridge connected to drive the motor in opposite directions.
8. A motion monitoring system as recited in claim 1, wherein the pulse detector comprises a comparator having first and second differential inputs, wherein the first differential input is connected to the drive current signal and the second differential input is connected to the averaged drive current signal.
9. A motion monitoring system as recited in claim 1, wherein the pulse detector produces a stream of binary pulses corresponding to motor position.
10. A motion monitoring system as recited in claim 1, wherein the pulse detector produces a stream of binary pulses at a frequency corresponding to motor velocity.
11. A motion monitoring system for monitoring movement of a brush-type DC motor that is driven by a drive current, comprising:
    an electrical comparator having first and second differential inputs;
    a current detector connected to provide a drive current signal to the first differential input of the comparator;
    a low-pass filter connected to provide an averaged drive current signal to the second differential input of the comparator;
    wherein the comparator produces a stream of binary pulses corresponding to motor movement.
12. A motion monitoring system as recited in claim 11, the current detector comprising a transistor that is part of an H-bridge connected to drive the motor in opposite directions.
13. A motion monitoring system as recited in claim 11, further comprising position determination logic configured to determine motor position in response to the binary pulses.
14. A motion monitoring system as recited in claim 11, further comprising velocity determination logic configured to determine motor velocity in response to the binary pulses.
15. A method of monitoring movement of a brush-type DC motor, comprising:
    driving the motor with an applied drive current;
    detecting pulses in the applied drive current by brush communication;
    the detecting step comprising deriving an average drive current based on the applied drive current and comparing the applied drive current to the average drive current;
    calculating motor movement based on said detected pulses.
16. A printer, comprising:
    a printhead;
    a moveable service station mechanism positioned to service the printhead;
    a brush-type DC motor connected to move the service station mechanism;

control logic configured to apply a drive current tot he DC motor;

a pulse detector connected to detect pulses in the applied drive current caused by brush commutation in the DC motor, wherein the pulse detector is responsive to the drive current and to an average drive current to produce a stream of binary pulses corresponding to motor movement;

wherein the control logic is responsive to the stream of binary pulses to calculate motor movement.

17. A printer as recited in claim 16, further comprising a current sensing resistance that provides the drive current signal to the pulse detector.

18. A printer as recited in claim 16, wherein the pulse detector is a comparator having first and second differential inputs, wherein the first differential input is connected to the drive current signal and the second differential input is connected to the averaged drive current signal.

19. A printer as recited in claim 16, wherein the pulse detector is a comparator having first and second differential inputs, further comprising;

a current detector connected to provide the drive current signal to the first differential input of the comparator;

a low-pass filter connected to provide the averaged drive current signal to the second differential input of the comparator.

20. A printer as recited in claim 16, wherein the pulse detector is a comparator having first and second differential inputs, further comprising;

an H-bridge transistor network having transistors connected to supply the drive current to the DC motor in response to the control logic;

a current detector connected to provide the drive current signal to the first differential input of the comparator;

a low-pass filter connected to provide the averaged drive current signal to the second differential input of the comparator;

wherein the detector is one of the H-bridge transistors.

* * * * *

UNITED STATES PATENT AND TRADEMARK OFFICE
CERTIFICATE OF CORRECTION

PATENT NO. : 5,898,288
DATED : April 27, 1999
INVENTOR(S) : Rice et al.

It is certified that error appears in the above-identified patent and that said Letters Patent is hereby corrected as shown below:

Column 2, (line 34), after "Fig. 6" delete "is".
Column 5, (line 25), delete "11I3" and insert therefor --113--.
Column 6, (line 44), delete "A-bridge" and insert therefor --H-bridge--.
Column 6, (line 46), delete "REVS" and insert therefor --RVS--.
Column 7, (line 21), after "Fig. 6" insert --.--.

Column 8, (line 1), delete "said-" and insert therefor --said--.
Column 8, (line 53), after "current" insert --caused--.
Column 8, (line 54), delete "communication" and insert therefor --commutation--.
Column 9, (line 1), delete "tot he" and insert therefor --to the--.

Signed and Sealed this

Seventh Day of December, 1999

Attest:

Q. TODD DICKINSON

*Attesting Officer*     Acting Commissioner of Patents and Trademarks